(12) United States Patent
Nagasawa

(10) Patent No.: US 9,308,882 B2
(45) Date of Patent: Apr. 12, 2016

(54) VEHICLE

(71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/478,212

(22) Filed: Sep. 5, 2014

(65) Prior Publication Data

US 2015/0091280 A1 Apr. 2, 2015

(30) Foreign Application Priority Data

Sep. 30, 2013 (JP) ................................. 2013-204524

(51) Int. Cl.
B60R 21/16 (2006.01)
B60R 21/015 (2006.01)
B60R 21/013 (2006.01)
B60R 21/207 (2006.01)
B60R 21/231 (2011.01)

(52) U.S. Cl.
CPC ............ B60R 21/015 (2013.01); B60R 21/013 (2013.01); B60R 21/207 (2013.01); B60R 2021/01516 (2013.01); B60R 2021/01575 (2013.01); B60R 2021/23153 (2013.01)

(58) Field of Classification Search
USPC .......................... 280/728.2, 730.1, 730.2, 734
See application file for complete search history.

(56) References Cited

U.S. PATENT DOCUMENTS

| 5,222,761 | A | * | 6/1993 | Kaji et al. ................... 280/730.2 |
| 5,324,071 | A | * | 6/1994 | Gotomyo et al. ........... 280/730.1 |
| 5,482,314 | A | * | 1/1996 | Corrado et al. ............... 280/735 |
| 6,557,887 | B2 | * | 5/2003 | Wohllebe .................... 280/730.1 |
| 2010/0090447 | A1 | * | 4/2010 | Deng et al. .................. 280/730.1 |
| 2015/0091281 | A1 | * | 4/2015 | Nagasawa ................... 280/730.1 |
| 2015/0091282 | A1 | * | 4/2015 | Nagasawa et al. .......... 280/730.1 |

FOREIGN PATENT DOCUMENTS

| JP | 10-273000 | 10/1998 |
| JP | 2010-052621 | 3/2010 |

* cited by examiner

Primary Examiner — Toan To
(74) Attorney, Agent, or Firm — Smith, Gambrell & Russell, LLP

(57) ABSTRACT

A vehicle has a front seat in which an airbag is deployed so as to inflate in an interior of a seat back in response to a collision, and a rear seat disposed behind the front seat. The vehicle includes: a rear occupancy detector that detects the presence of a seat occupant in the rear seat; and a controller that controls deployment/inflation of the airbag. The airbag in the seat back elastically supports an upper body of a seat occupant of the front seat, and elastically receives an impact force exerted on a back surface of the seat back. The controller cancels deployment/inflation of the airbag when a seat occupant is not present in the rear seat.

21 Claims, 14 Drawing Sheets

VEHICLE

CROSS-REFERENCE TO RELATED APPLICATIONS

The present application claims priority from Japanese Patent Application No. 2013-204524, filed on Sep. 30, 2013, the entire contents of which are hereby incorporated by reference.

BACKGROUND

1. Technical Field

The present invention relates to a vehicle, and more particularly to a vehicle in which an airbag is installed in a seat back of a front seat, from among seats disposed on front and rear sides.

2. Related Art

In a conventional vehicle such as an automobile, a seat occupant is protected from an impact generated during a collision by deploying/inflating an airbag disposed in a seat back of a vehicle seat.

In a vehicle seat disclosed in Japanese Unexamined Patent Application Publication (JP-A) No. H10-273000, for example, a seat pad is provided on a front surface of a suspended elastic support member suspended within a seat back frame, and an airbag is disposed in a deflated condition within a gap between the suspended elastic support member and a rigidly structured support plate disposed behind the suspended elastic support member.

According to this vehicle seat, the airbag is inflated between the suspended elastic support member and the support plate by an action of an inflator following detection of at least a predetermined impact load. As a result, rearward movement of the seat occupant during a collision is supported elastically, and thereby restricted, from behind, while an impact energy generated by the collision is absorbed through depressurization and deflation of the airbag.

Further, in an airbag device disclosed in JP-A No. 2010-052621, a first airbag that is deployed so as to inflate toward a seat occupant of a rear seat is disposed in a back surface lower portion of a seat back of a front seat, and a second airbag is disposed in a flattened condition on a front surface of a suspended elastic support member suspended within a seat back frame of the seat back of the front seat.

According to this airbag device, the first airbag is deployed so as to inflate toward the seat occupant of the rear seat by an action of an inflator following detection of at least a predetermined impact such that even when the seat occupant of the rear seat is moved forward by an impact generated during a collision, the seat occupant is prevented from forcefully striking a back surface of the seat back of the front seat. Further, by deploying/inflating the second airbag, rearward movement of an upper body of a seat occupant of the front seat during the collision is elastically supported, and thereby restricted, from behind, and as a result, the seat occupant is protected. Furthermore, by controlling respective inflation timings of the first and second airbags, the seated passengers are protected appropriately.

As described above, however, in the vehicle seat disclosed in JP-A No. H10-273000, the seat occupant of the seat is protected by the airbag and the existence of the rigidly configured support plate behind and on an outer side of the airbag. In other words, an impact generated by rearward movement of the seat occupant is alleviated by the airbag, while an impact applied from the rear of the seat back is first received by the support plate and then absorbed by the airbag. Therefore, when, for example, a seat exists behind the seat and the rear seat is occupied, and the rear seat occupant collides with the seat back of the front seat from behind, a large impact is generated upon collision with the support plate. Hence, the impact from the rear cannot be received softly, and as a result, knees and so on of the rear seat occupant may be damaged, and the front seat occupant may also receive a large impact.

According to the airbag device of JP-A No. 2010-052621, on the other hand, protection and damage reduction in relation to the seat occupant of the front seat can be expected from the second airbag that is deployed so as to inflate within the seat back of the front seat, and since the first airbag is deployed so as to inflate toward the rear seat occupant side, the rear seat occupant is also protected. However, the first airbag that is deployed so as to inflate rearward and outward from the seat back must be provided separately in the lower portion of the seat back of the front seat in addition to the airbag disposed in the seat back, leading to increases in the structural complexity of the seat back and a control load exerted on the respective airbags.

Further, the first airbag swells diagonally upward by a large amount from the back surface lower portion of the seat back of the front seat toward the occupant of the rear seat, and therefore an inflating deployment shape thereof is unstable. Stability may therefore be lacking with respect to accurate and reliable reception of a collision between the seat occupant of the rear seat and the seat back of the front seat, and absorption of the resulting impact.

Hence, in the respective structures of the conventional patent documents described above, there remains room for improvement in terms of protecting a seat occupant of a front seat directly using an airbag and protecting the front seat occupant from an impact on the seat back from behind using a simple structure.

Note that in a vehicle such as an automobile, a collision between the knees and so on of the rear seat occupant and the seat back of the front seat, such as that described above, may occur not only during a collision from the front, but also in a situation where a collision occurs from the rear such that a vehicle body rear portion deforms or the like, causing the rear seat occupant to be pushed forward such that his or her knees forcefully strike the back surface of the seat back of the front seat.

SUMMARY OF THE INVENTION

The present invention has been designed in consideration of problems such as those described above, and an object thereof is to provide a vehicle in which, during a collision, a seat occupant can be protected directly by an airbag and an impact on the seat occupant from the rear of a seat back can be reduced accurately without an accompanying increase in structural complexity.

To achieve this object, a first aspect of the present invention provides a vehicle that has a front seat in which an airbag is deployed so as to inflate in an interior of a seat back in response to a collision, and a rear seat disposed behind the front seat. The vehicle includes: a rear occupancy detector that detects the presence of a seat occupant in the rear seat; and a controller for controlling deployment/inflation of the airbag. The deployment/inflation within the seat back is performed such that the deployed/inflated airbag elastically supports an upper body of a front seat occupant and elastically receives an impact force exerted on a back surface of the seat back. The controller cancels the deployment/inflation when a seat occupant is not present in the rear seat.

A second aspect of the present invention provides a vehicle that has a front seat in which an airbag is deployed so as to inflate in an interior of a seat back in response to a collision, and a rear seat disposed behind the front seat. The vehicle includes a child seat attachment detector that detects attachment of a child seat to the rear seat; and a controller that controls deployment/inflation of the airbag. The deployment/inflation within the seat back is performed such that the deployed/inflated airbag elastically supports an upper body of a front seat occupant and elastically receives an impact force exerted on a back surface of the seat back. The controller cancels the deployment/inflation when a child seat is attached to the rear seat.

A third aspect of the present invention provides a vehicle that has a front seat in which an airbag is deployed so as to inflate in an interior of a seat back in response to a collision, and a rear seat disposed behind the front seat. The vehicle includes a rear seat occupant type detector that detects a type of a seat occupant of the rear seat; and a controller that controls deployment/inflation of the airbag. The deployment/inflation within the seat back is performed such that the deployed/inflated airbag elastically supports an upper body of a front seat occupant and elastically receives an impact force exerted on a back surface of the seat back. The controller cancels the deployment/inflation when the type of the seat occupant is a predetermined body type.

A fourth aspect of the present invention provides a vehicle that has a front seat in which an airbag is deployed so as to inflate in an interior of a seat back in response to a collision, and a rear seat disposed behind the front seat. The vehicle includes; a rear seat load detector that detects a condition of a load carried on the rear seat; and a controller that controls deployment/inflation of the airbag. The deployment/inflation within the seat back is performed such that the deployed/inflated airbag elastically supports an upper body of a front seat occupant and elastically receives an impact force exerted on a back surface of the seat back. The controller cancels the deployment/inflation when the load carried on the rear seat is in a predetermined condition.

The vehicle may further include a collision sensor for predicting or detecting a rear collision. The deployment/inflation may be performed after the collision sensor predicts or detects a rear collision.

The front seat may be a front passenger seat, and the vehicle may further include a front passenger seat occupancy detector that detects the presence of a seat occupant in the front passenger seat. The deployment/inflation may be canceled when a seat occupant is not present in the front passenger seat.

DETAILED DESCRIPTION

Figure 1:
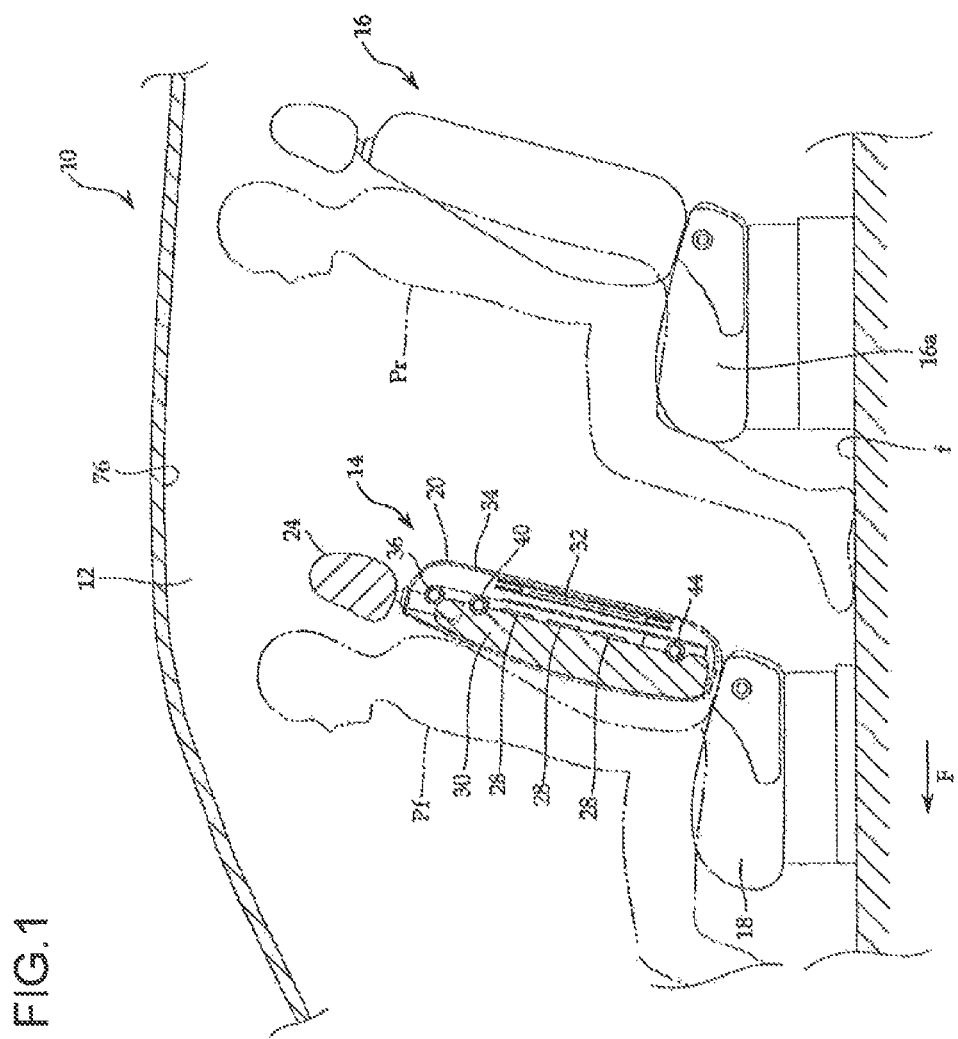
FIG. 1 is a schematic sectional view illustrating main parts of a vehicle 10 according to an implementation of the present invention.
Figure 2:
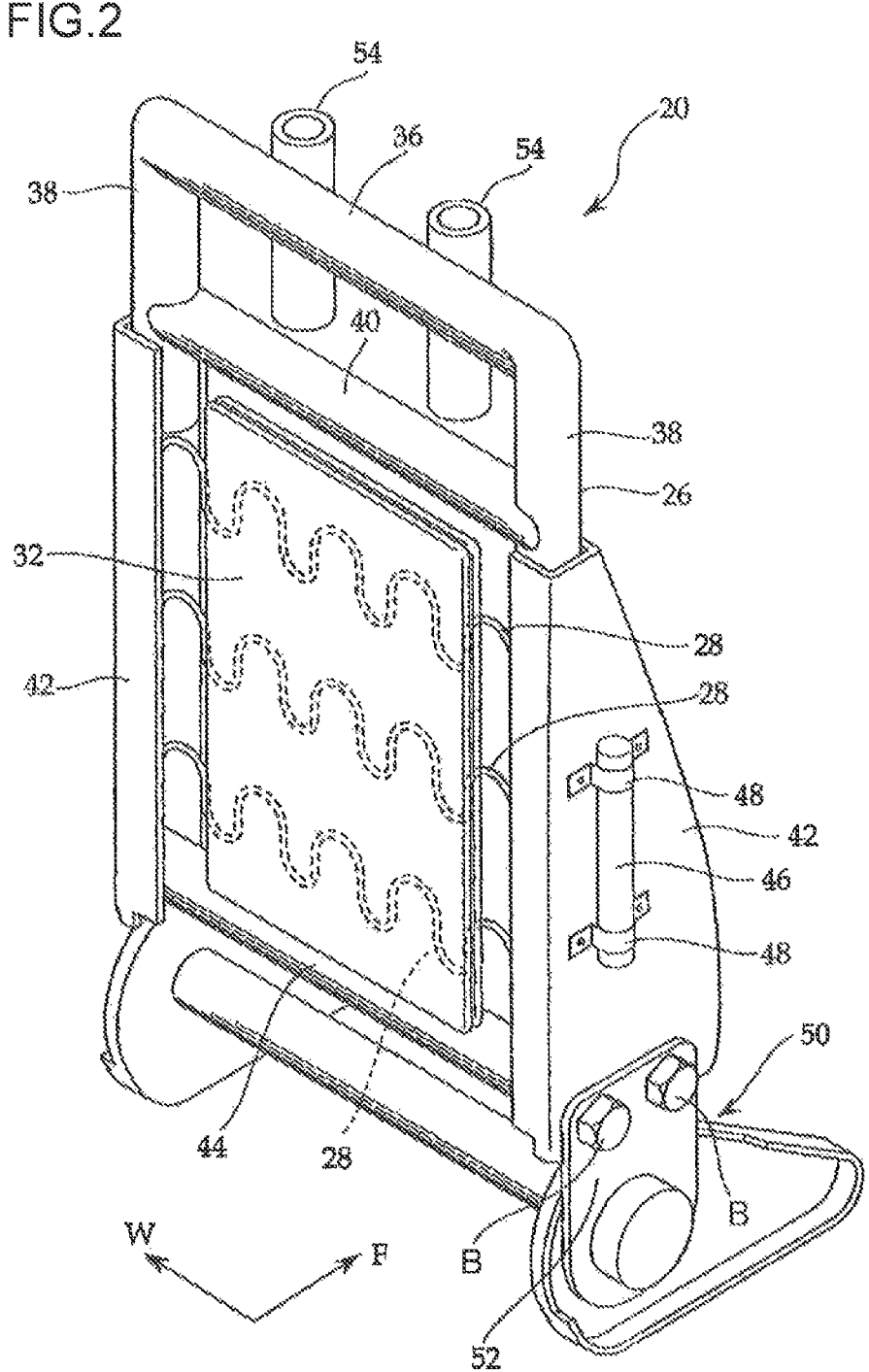
FIG. 2 is a partially cutaway schematic perspective view illustrating a front seat 14 of the vehicle 10 according to this implementation, as viewed from behind.
Figure 3:
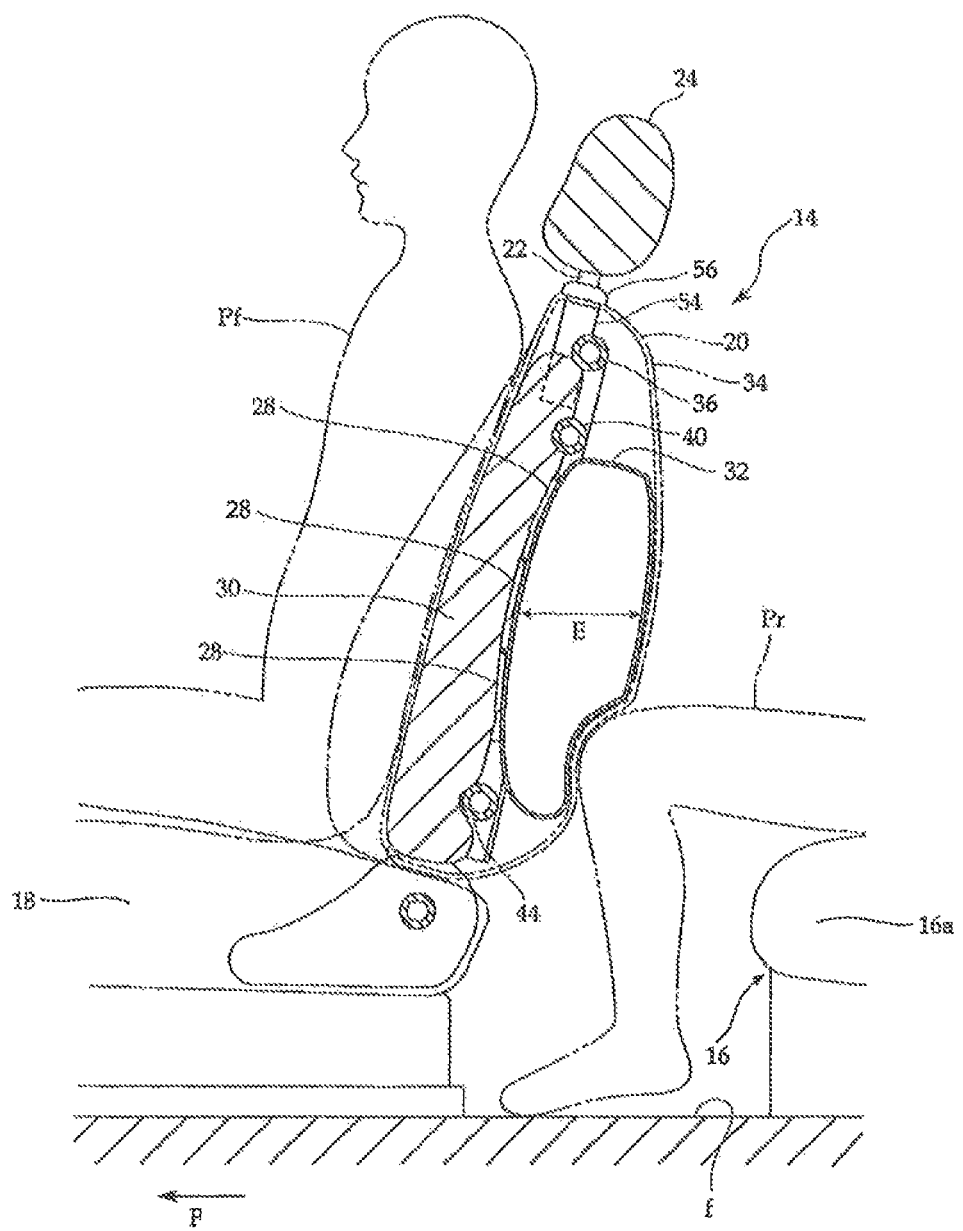
FIG. 3 is an illustrative operational diagram illustrating an impact generated by an airbag 32 provided in the front seat 14 of the vehicle 10 according to this implementation.
Figure 4:
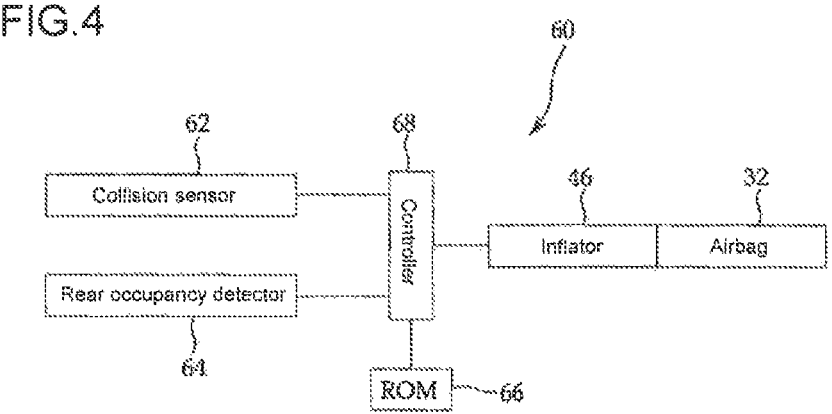
FIG. 4 is a block diagram illustrating a control circuit of the airbag 32 provided in the front seat 14 of the vehicle 10 according to this implementation.
Figure 5:
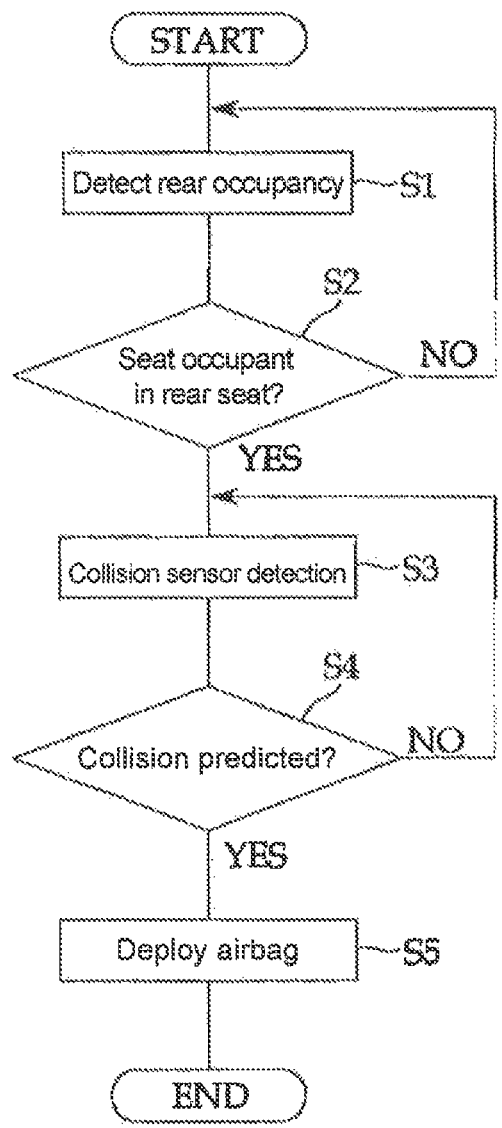
FIG. 5 is a flowchart illustrating deployment/inflation of the airbag 32 provided in the front seat 14 of the vehicle 10 according to this implementation.

Next, an implementation of the present invention will be described in detail on the basis of the drawings. FIG. 1 is a schematic sectional view illustrating main parts of a vehicle 10 according to this implementation. FIG. 2 is a partially cutaway schematic perspective view illustrating a front seat 14 of the vehicle 10, as viewed from behind. FIG. 3 is an illustrative operational diagram illustrating an impact generated by an airbag 32 provided in the front seat 14 of the vehicle 10. FIG. 4 is a block diagram illustrating a control circuit of the airbag 32 provided in the front seat 14 of the vehicle 10. FIG. 5 is a flowchart illustrating deployment/inflation of the airbag 32 provided in the front seat 14 of the vehicle 10. Note that in the drawings, an arrow F indicates a vehicle body frontward direction, and an arrow W indicates a vehicle width direction.

As illustrated in FIG. 1, the front seat 14, which serves as a driving seat, and a rear seat 16 behind the front seat 14 are disposed on a floor f in a passenger compartment 12 of the vehicle 10. The front seat 14 includes a seat cushion 18 that is supported on the floor f in order to support the bottom of a seat occupant Pf, a seat back 20 that supports an upper body of the seat occupant Pf from the waist to the chest, and a headrest 24 disposed above the seat back 20 and supported on the seat back 20 via a headrest stay 22.

When the vehicle 10 is being driven, the head of the seat occupant Pf may be placed on the headrest 24, but in this position driving operations are difficult, and therefore normally, as illustrated in FIG. 1, the seat occupant Pf sits in the front seat 14 with his or her head slightly moved away from the headrest 24.

In the front seat 14, as illustrated in FIGS. 1 and 2, multiple suspended elastic support members 28 are suspended in a stretched condition within a seat back frame 26 forming a skeleton of the seat back 20, a seat pad 30 is disposed on a front surface of the suspended elastic support members 28, the airbag 32 is disposed in a deflated condition behind the suspended elastic support members 28, and all of these components are covered by a flexible covering material 34.

As illustrated in FIG. 2, the seat back frame 26 is formed in a substantially rectangular frame shape by an inverted C-shaped, or in other words a U-shaped, pipe frame constituted by an upper frame 36 extending in the vehicle width direction and a pair of side frames 38 that are curved, or in other words bent, downward from respective ends of the upper frame 36 so as to extend downward, a pipe-shaped upper cross member 40 that extends in the vehicle width direction so as to be suspended between the left and right side frames 38 in the vicinity of upper ends thereof, a left-right pair of side brackets 42 disposed fixedly on respective side ends of the side frames 38, and a pipe-shaped lower cross member 44 suspended between the respective side brackets 42 in the vicinity of lower ends thereof.

The suspended elastic support members 28, which are constituted by S shaped springs formed from metal wire or the like, and which in this implementation include three suspended elastic support members 28, are suspended in a stretched condition between either the opposing side frames 38 or the side brackets 42. In this implementation, the suspended elastic support members 28 are suspended between the side brackets 42.

The seat pad 30, which is constituted by a urethane foam material or the like that supports the upper body of the seat occupant Pf elastically, is disposed on the front surface of the suspended elastic support members 28, and the airbag 32 is disposed behind the suspended elastic support members 28 in a deflated condition folded into a rectangular planar shape.

The covering material 34 is formed from fabric (including woven fabric, knitted fabric, and nonwoven fabric) or leather (including natural leather, and synthetic leather) as a bag-shaped flexible member, and as described above, covers the entirety of the seat back frame 26, the airbag 32, and so on. As a result, the seat back 20 is formed to be capable of elastically supporting the upper body of the seat occupant Pf, in particular the chest to the waist, from behind.

The airbag 32 is held within the covering material 34 and so on by a latch, not illustrated in the drawings, to be deployable/inflatable, for example, and is coupled to a cylindrical inflator 46 serving as a generation source of gas for deploying/inflating the airbag 32 via a gas introduction unit, not illustrated in the drawings. The airbag 32 is configured to be deployed instantaneously in response to gas injection from the inflator 46 so as to inflate in a planar fashion.

Further, the airbag 32 includes orifices, not illustrated in the drawings, for discharging gas in the interior thereof to the exterior, and a hole diameter and a number of the orifices are set such that the gas in the interior is discharged gradually in response to compression applied after the airbag 32 is deployed/inflated.

In this implementation, as illustrated in FIG. 2, the inflator 46 is attached to a vehicle body outer-side side face of the side bracket 42 disposed on the vehicle body outer side via an inflator bracket 46.

As will be described below, the inflator 46 is configured to ignite and eject gas when it receives a signal from a controller 68 on the basis of an output of a collision sensor 62 that predicts or detects a front collision or a rear collision of the vehicle 10.

Base ends of the respective side brackets 42 forming the seat back frame 26 are attached to a rotating arm 52 of a reclining device 50 disposed on a rear end of the seat cushion 18 by screwing attachment bolts B thereto. As a result, the seat back frame 26 is coupled integrally to the rotating arm 52 of the reclining device 50. Note that a conventional device may be used as the reclining device 50, and since the reclining device 50 is not directly related to the present invention, detailed description thereof has been omitted.

As illustrated in FIGS. 1 and 2, a left-right pair of tubular stay brackets 54 is formed integrally with the upper frame 36 forming the seat back frame 26. By inserting the headrest stay 22 attached to the headrest 24 into the stay brackets 54 via an interposed headrest holder 56 and latching the headrest stay 22, the headrest 24 is attached to an upper end of the seat back 20.

Hence, as illustrated in FIGS. 1 and 2, the airbag 32 deflated into a substantially rectangular planar shape is housed in the seat back 20 in a gap between the suspended elastic support members 28 and the covering material 34, and within the seat back 20, the front of the deployed/inflated airbag 32 is covered by flexible materials including the suspended elastic support members 28, the seat pad 30, and the covering material 34, while the rear of the airbag 32 is covered by the flexible covering material 34.

Next, a control circuit 60 of the airbag 32, which controls deployment/inflation of the airbag 32 within the seat back 20 in accordance with the presence of a seat occupant Pr in the rear seat 16, will be described with reference to FIG. 4. As illustrated in the drawing, a controller 68 controls an operation of the inflator 46 in accordance with collision occurrence information, which is output by the collision sensor 62 serving as a collision detector that predicts a rear collision or a front collision of the vehicle 10, a rear occupancy detector 64 that detects the presence of the seat occupant Pr in the rear seat 16, and information stored in a ROM 66.

In this implementation, the collision sensor 62 is a collision detector attached to the rear of the vehicle 10 to predict a rear collision, and is configured to include a distance sensor such as a millimeter wave sensor, for example.

Various sensors, such as an image sensor, an infrared ray sensor, a weight sensor, and a capacitance sensor, may be used as the rear occupancy detector 64. In this implementation, a pressure sensitive sensor (not illustrated) is used and disposed over a wide range of a seat cushion 16a of the rear seat 16.

Inflation/deployment control executed on the airbag 32 by the controller 68 will now be described on the basis of the flowchart illustrated in FIG. 5. First, when the control is started in response to insertion of an ignition key into the automobile, the controller 68 performs rear occupancy detection using the rear occupancy detector 64 in a first step S1. More specifically, the rear occupancy detector 64 constituted by a pressure sensitive sensor supplies the controller 68 with detection output obtained by the pressure sensitive sensor disposed on the seat cushion 16a of the rear seat 16.

Next, in a second step S2, the controller 68 compares the supplied output with a preset output pattern stored in the ROM 66, and determines whether or not the rear seat 16 is occupied by the seat occupant Pr in accordance with whether or not the supplied output matches the output pattern and exceeds a threshold.

More specifically, the rear seat 16 is determined to be occupied by the seat occupant Pr when the supplied output corresponds to the preset output pattern, or in other words a similar output pattern to that of a concentrated load obtained from a person sitting down (an affirmative determination), and accordingly, the control advances to a third step S3. When it is determined that the rear seat 16 is not occupied by the seat occupant Pr (a negative determination), the control returns to the first step S1.

In the third step S3, the controller 68 performs collision sensor detection. More specifically, detection output from the millimeter wave sensor or the like constituting the collision sensor 62 (a collision detector) is supplied to the controller 68. On the basis of this output, in a fourth step S4, the controller 68 calculates a relative distance and a relative speed between the host vehicle and another vehicle from the supplied output. The controller 68 then compares the calculated relative distance and relative speed with relative distance and relative speed information stored in the ROM 66. When the calculated relative distance is no greater than a fixed distance and the relative speed exceeds a fixed value, the controller 68 determines that the collision sensor 62 has predicted a rear collision (an affirmative determination), and therefore the control advances to a fifth step 35. When it is determined that the collision sensor 62 has not predicted a rear collision (a negative determination), the control returns to the third step S3.

In the fifth step S5, the controller 68 outputs a signal to the inflator 46 in order to ignite the inflator 46. The signal may be output to the inflator 46 at a preferred timing before, at the same time as, or after the collision predicted from the calculated relative distance and relative speed. As a result, as illustrated in FIG. 3, the airbag 32 is deployed instantaneously by the gas ejected from the inflator 46 so as to inflate within a region between the suspended elastic support members 28 and a back surface of the seat back 20.

At this time, the front of the airbag 32 is covered by flexible materials including the suspended elastic support members 28, the seat pad 30, and the covering material 34, and therefore, when the airbag 32 is deployed so as to inflate, the flexible materials behave so as to deform slightly in the vehicle body frontward direction of FIG. 3. Meanwhile, the flexible covering material 34 covering the rear of the airbag 32 exhibits deforming behavior so as to project greatly toward the rear of the vehicle body. As a result of this deforming behavior of the flexible materials to the front and rear of the airbag 32, a deployment amount E of the airbag 32 in a vehicle body front-rear direction is secured, and therefore a large impact absorption stroke in the vehicle body front-rear direction is secured in the seat back 20.

In other words, as illustrated in the drawing, rearward movement of the upper body of the seat occupant Pf of the front seat 14 due to an impact generated by the rear collision is received elastically by the covering material 34 on the front surface of the seat back 20, the seat pad 30, the suspended elastic support members 28, and the deployed/inflated airbag 32, and as a result, the upper body of the seat occupant Pf of the front seat 14 is protected from an impact received when the seat occupant Pt is pressed against the seat back 20 of the seat by the rear collision.

Meanwhile, the rear seat occupant Pr is pushed against the rear seat 16 by the impact of the rear collision and is then moved forward by a rebound. As a result of this rebound, the knees of the forward-moving seat occupant Pr of the rear seat 16 are received elastically by the covering material 34 on the rear surface of the seat back 20 and the deployed/inflated airbag 32, and therefore the upper body of the seat occupant Pf of the front seat 10 is protected from an impact generated when the knees of the seat occupant Pr of the rear seat 16 strike the back surface of the seat back 20.

Hence, in the vehicle 10 according to this implementation, when the rear seat 16 is occupied by the seat occupant Pr, the airbag 32 is deployed in response to a rear collision so as to inflate within the seat back 20 of the front seat 14. Therefore, in a situation where the seat occupant Pr of the rear seat. 16 may strike the back surface of the seat back 20 of the front seat 14 due to the collision so that the seat occupant Pf of the front seat 14 must be protected securely by the airbag 32, an impact exerted on the back surface of the seat back 20 of the front seat 14 from the rear (in other words, an impact generated by the forward movement of the seat occupant Fr of the rear seat 16) is reduced reliably, and simultaneously, an impact occurring when the upper body of the seat occupant Pf of the front seat 14 is moved rearward by the collision such that the upper body is pressed against the front surface of the seat back 20 is reduced.

Protection of the seat occupant Pf is achieved simply by deploying/inflating the airbag 32 provided in the interior of the seat back 20, and therefore a required configuration is greatly simplified. Further, as described above, the airbag 32 is deployed so as to inflate within the seat back 20 of the front seat 14, and is therefore constrained to a certain extent by an interior shape of the seat back 20. As a result, the airbag 32 is deployed so as to inflate with stability.

Further, when a seat occupant is not present in the rear seat 16, or in other words when it is predicted that an impact will not be exerted on the back surface of the seat back 20 from the rear, the controller 68 cancels deployment/inflation of the airbag 32 in the front seat 14, and therefore unnecessary deployment/inflation of the airbag 32, as well as labor required to replace the airbag 32 and the inflator 46 and so on as a result, can be avoided.

Furthermore, in this implementation, the collision sensor 62 is a collision detector that predicts a rear collision rather than a collision sensor that predicts a front collision, and therefore the airbag 32 is not deployed/inflated when a front collision occurs.

Therefore, in a case where a so-called chain collision occurs, or in other words when the vehicle 10 is involved in a rear collision following a front collision, the airbag 32 can be deployed so as to inflate in response to the impact generated by the rear collision following the front collision, and as a result, the seat occupant Pf of the front seat 14 can be protected appropriately.

In the implementation described above, the output of the rear occupancy detector 64 is used as an index for controlling deployment/inflation of the airbag 32, and a collision detector that predicts a rear collision is used as the collision sensor 62. However, the present invention is not limited to these sensors.

A modified example in which a rear seat occupant type detector 72 is used instead of the rear occupancy detector 64 and a collision sensor 74 that detects a rear collision is used instead of the collision sensor 62 (the collision detector) that predicts a rear collision will be described below with reference to FIGS. 6 and 7. In this modified example, the vehicle 10 is configured such that the determination as to whether or not it is necessary to deploy/inflate the airbag 32 is made in accordance with a physical type of the rear seat occupant Pr, and the airbag 32 is deployed/inflated after a rear collision is actually detected. Note that similar constituent elements to the implementation described above have been allocated identical reference symbols, and detailed description thereof has been omitted.

Figure 6:
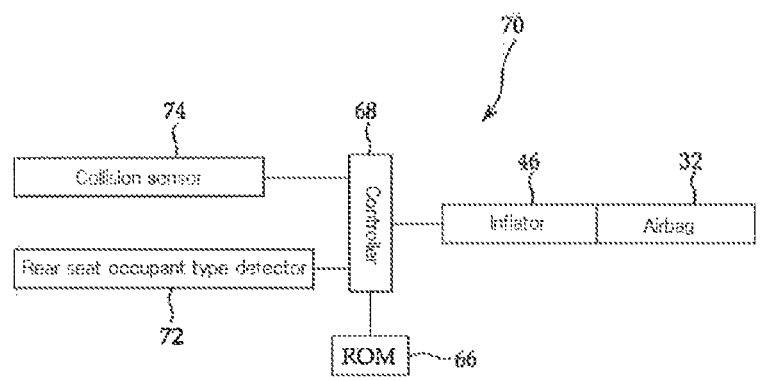
FIG. 6 is a block diagram illustrating a control circuit of the airbag 32 provided in the front seat 14 of the vehicle 10 according to a modified example of this implementation.
Figure 7:
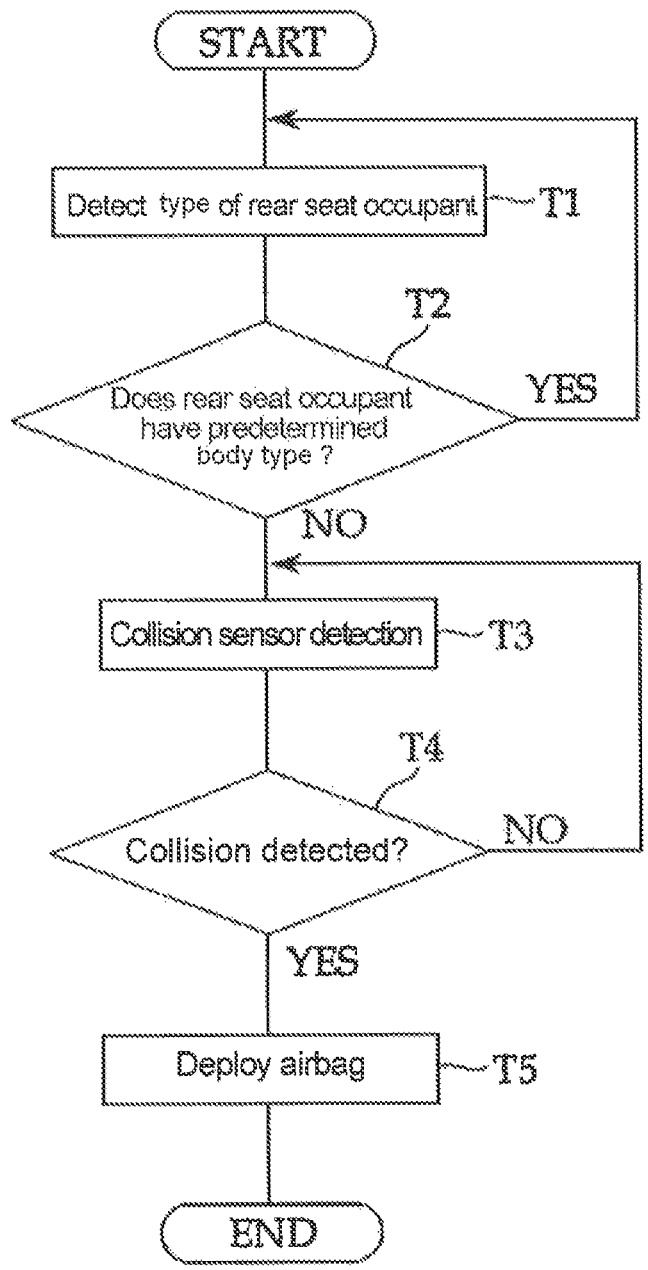
FIG. 7 is a flowchart illustrating deployment/inflation of the airbag 32 provided in the front seat 14 of the vehicle 10 according to this modified example of the implementation.

FIG. 6 is a block diagram illustrating a control circuit of the airbag 32 provided in the front seat 14 of the vehicle 10. FIG. 7 is a flowchart illustrating deployment/inflation of the airbag 32 provided in the front seat 14 of the vehicle 10.

Various sensors, such as an image sensor, an infrared ray sensor, a weight sensor, and a capacitance sensor, or a combination thereof, may be used as the rear seat occupant type detector 72 provided in a control circuit 70 illustrated in FIG. 6. In this modified example, the rear seat occupant type detector 72 is an image sensor attached to a ceiling surface 76 (see FIG. 1) above the rear seat 16.

In this implementation, the collision sensor 74 is an acceleration sensor provided on a rear bumper (not illustrated) of the vehicle 10 to detect an acceleration generated by a rear collision. The collision sensor 74 (an acceleration sensor) outputs a signal (an analog signal or the like) corresponding to the image of the rear collision.

Deployment/inflation control of the airbag 32 according to this modified example will now be described on the basis of the flowchart illustrated in FIG. 7. First, when the control is started in response to insertion of the ignition key into the automobile, the controller 68 detects the body type of the seat occupant Pr of the rear seat 16 using the rear seat occupant type detector 72 in a first step T1. More specifically, the rear seat occupant type detector 72 constituted by an image sensor attached to the ceiling surface 76 of the vehicle 10 detects the body type of the seat occupant Pr of the rear seat 16 and supplies the controller 68 with detection output.

Next, in a second step T2, the controller 68 compares the supplied output with a preset output pattern stored in the ROM 66 to determine whether or not the compared output matches the output pattern, i.e. whether or not the seat occupant Pr of the rear seat 16 has a predetermined body type.

A length from the waist to the knees, an upper body height from the waist to the head, a knee position, and so on of the seat occupant Pr of the rear seat 16 on the image output from the rear seat occupant type detector 72 (the image sensor) may be used as indices for determining whether or not the seat occupant Pr has the predetermined body type.

The output pattern is determined from the indices described above, and when the output from the rear seat occupant type detector 72 (the image sensor) matches the output pattern, or in other words when the seat occupant Pr of the rear seat 16 is determined to have the predetermined body type (an affirmative determination), the control returns to the first step T1 When it is determined that the seat occupant Pr of the rear seat 16 does not have the predetermined body type to negative determination), the control advances to a third step T3. Note that the seat occupant Pr of the rear seat 16 "has the predetermined body type" when it is determined, from the length from the waist to the knees, the upper body height from the waist to the head, and the knee position of the seat occupant Pr of the rear seat 16, that the seat occupant Pr is an adult having a small build, a child, or the like.

In the third step T3, the controller 68 performs collision sensor detection. More specifically, detection output from the collision sensor 74 (the collision detector) is supplied to the controller 68. In a fourth step T4, the controller 68 compares this output with an output pattern stored in the ROM 66, and when the supplied output is larger than the output pattern, determines that a rear collision has been detected (an affirmative determination) The control then advances to a fifth step T5. When it is determined that a rear collision has not been detected (a negative determination), the control returns to the third step T3.

In the fifth step T5, the controller 68 outputs a signal to the inflator 46 in order to ignite the inflator 46. The signal is output to the inflator 46 at a timing immediately after it is determined that a rear collision has been detected. As a result, as illustrated in FIG. 3, the airbag 32 is deployed instantaneously by the gas ejected from the inflator 46 so as to inflate within the region between the suspended elastic support members 28 and the rear surface of the seat back 20.

According to this configuration, a determination is made as to whether or not the seat occupant Pr of the rear seat 16 has the predetermined body type. In other words, as described above, a determination is made from the length from the waist to the knees, the upper body height from the waist to the head, the knee position, and so on of the seat occupant Pr of the rear seat 16 as to whether or not the seat occupant Pr is an adult having a small build, a child, or the like. The airbag 32 is then deployed within the seat back 20 disposed directly behind the upper body of the seat occupant Pf of the front seat 14 so as to inflate with stability while constrained to a certain extent by the interior shape of the seat back 20 except in cases where the seat occupant Pr of the rear seat 16 has the predetermined body type.

Therefore, only in a situation where the seat occupant Pr of the rear seat 16 may, due to his or her body type (an adult having a large build or the like), strike the back surface of the seat back 20 of the front seat 14 during a collision so that the seat occupant Pf of the front seat 14 must be protected securely by the airbag 32, an impact generated when the upper body of the seat occupant Pf of the front seat 14 is moved rearward by the collision such that the upper body is pressed against the front surface of the seat back 20 is reduced, and an impact exerted on the back surface of the seat back 20 of the front seat 14 from the rear (in other words, an impact generated by forward movement of the seat occupant Pr of the rear seat 16) is reduced accurately.

Protection of the seat occupant is achieved simply by deploying/inflating the airbag 32 provided in the interior of the seat back 20, and therefore the required configuration is greatly simplified.

Further, in the implementation described above, the output of the rear occupancy detector 64 is used as the index for controlling deployment/inflation of the airbag 32. However, the present invention is not limited thereto.

Another modified example in which a rear seat load detector 82 is used instead of the rear occupancy detector 64 will be described below with reference to FIGS. 8 and 9. In this modified example, the vehicle 10 is configured such that the determination as to whether or not it is necessary to deploy/inflate the airbag 32 is made in accordance with a weight and a size of a load carried on the rear seat 16. Note that similar constituent elements to the implementation described above have been allocated identical reference symbols, and detailed description thereof has been omitted.

Figure 8:
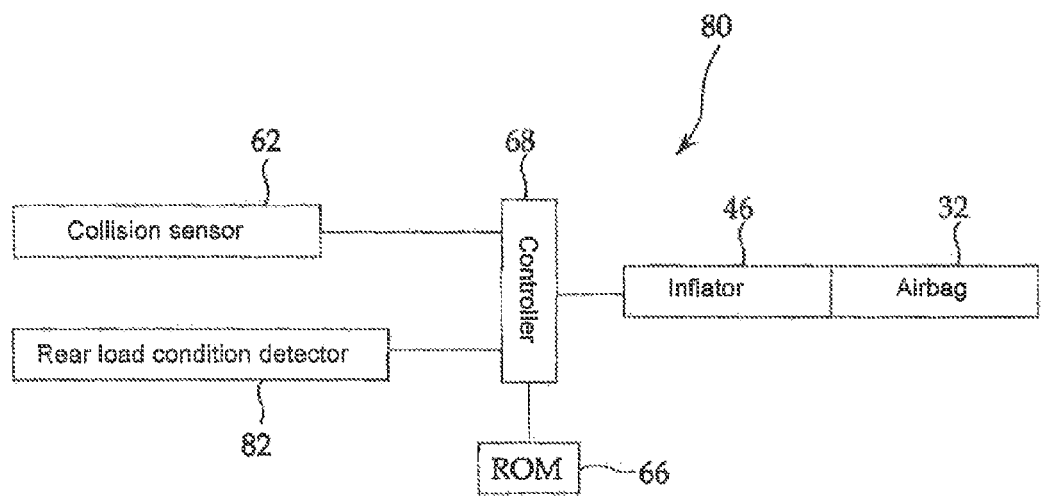
FIG. 8 is a block diagram illustrating a control circuit of the airbag 32 provided in the front seat 14 of the vehicle 10 according to another modified example of this implementation.
Figure 9:
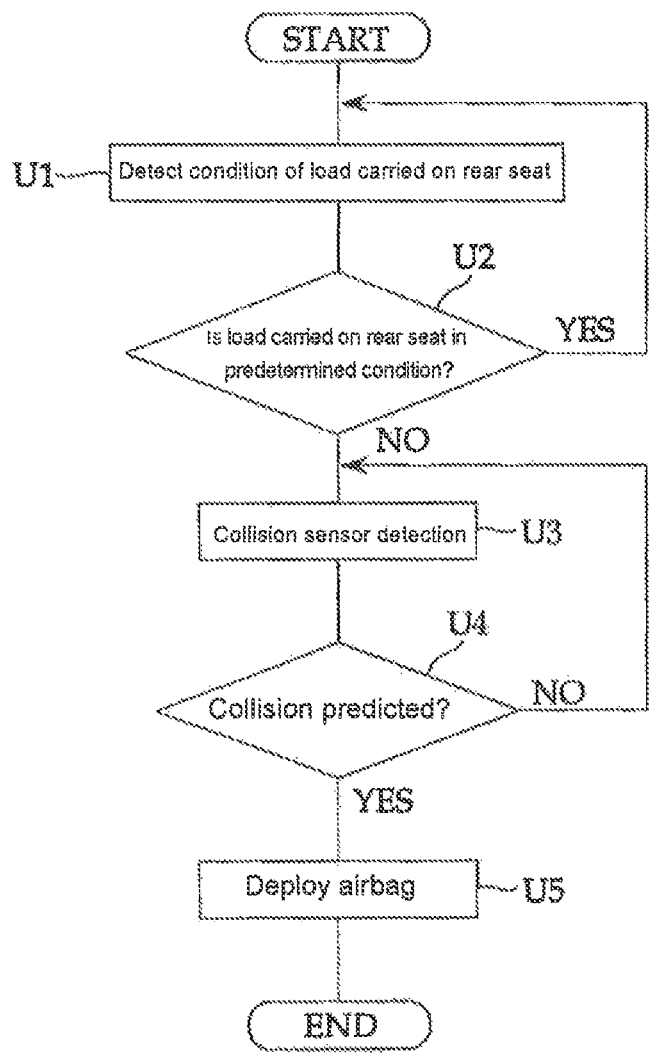
FIG. 9 is a flowchart illustrating deployment/inflation of the airbag 32 provided in the front seat 14 of the vehicle 10 according to this another modified example of the implementation.

FIG. 8 is a block diagram illustrating a control circuit of the airbag 32 provided in the front seat 14 of the vehicle 10, FIG. 9 is a flowchart illustrating deployment/inflation of the airbag 32 provided in the front seat 14 of the vehicle 10.

Various sensors, such as an image sensor, an infrared ray sensor, a weight sensor, and a capacitance sensor, or a combination thereof, may be used as the rear seat load detector 82 provided in a control circuit 80 illustrated in FIG. 8. In this modified example, the rear seat load detector 82 is constituted by a combination of a weight sensor disposed on the rear seat. 16 and infrared ray sensors disposed in multiple locations such as the ceiling surface 76 of the vehicle 10 and the back surface of the seat back 20 of the front seat 14.

Inflation/deployment control of the airbag 32 according to this modified example will now be described on the basis of the flowchart illustrated in FIG. 9. First, when the control is started in response to insertion of the ignition key into the automobile, the controller 58 detects a condition of the load carried on the rear seat 16 using the rear seat load detector 82 in a first step U1. More specifically, the weight sensor of the rear seat load detector 82 in the vehicle 10 detects a weight of the load carried on the rear seat 16, the infrared ray sensors disposed in multiple locations detect a vehicle front-rear direction length, a height on the seat, and a vehicle width direction width of the load, and resulting detection output is supplied to the controller 68.

Next, in a second step U2, the controller 68 compares the supplied output with a preset output pattern stored in the ROM 66 to determine whether or not the supplied output matches the output pattern, i.e. whether or not the load carried on the rear seat 16 is in a predetermined condition.

More specifically, when the weight equals or exceeds a fixed value and the size of the load obtained from the output of the infrared ray sensors exceeds a fixed value, it is determined that the load is not in the predetermined condition in which there is no danger of the load forcefully striking the back surface of the seat back 20 of the front seat 14 (a negative determination). Accordingly, the control advances to a third step U3. When it is determined that the load is in the predetermined condition (an affirmative determination), the control returns to the first step U1.

The third step U3 to a fifth step U5 performed subsequently are identical to the implementation described above (see the flowchart in FIG. 5), and therefore description thereof has been omitted.

According to this configuration, when the load carried on the rear seat 16 is not in the predetermined condition, for example when the load is heavy and large, the airbag 32 is deployed within the seat back 20 disposed directly behind the upper body of the seat occupant Pf of the front seat 14 so as to inflate with stability while constrained to a certain extent by the interior shape of the seat back 20.

Therefore, in a situation where the load carried on the rear seat 16 may, due to its condition, strike the back surface of the seat back 20 of the front seat 14 during a collision so that the seat occupant Pf of the front seat 14 must be protected securely by the airbag 32, an impact generated when the upper body of the seat occupant Pf of the front seat 14 is moved rearward by the collision such that the upper body is pressed against the front surface of the seat back 20 is reduced, and an impact exerted on the back surface of the seat back 20 of the front seat 14 from the rear (in other words, an impact generated by forward movement of the load carried on the rear seat 16) is reduced accurately. Protection of the seat occupant is achieved simply by deploying/inflating the airbag provided in the interior of the seat back, and therefore the required configuration is greatly simplified.

Conversely, when the load carried on the rear seat 16 is in the predetermined condition such that there is no danger of the load forcefully striking the back surface of the seat back 20 of the front seat 14 during a collision due to its condition, deployment/inflation of the airbag 32 is canceled, and therefore unnecessary deployment/inflation of the airbag 32, as well as labor required to replace the airbag 32 and the inflator 46 and so on as a result, can be avoided.

Further, in the implementation described above, the output of the rear occupancy detector 64 is used as the index for controlling deployment/inflation of the airbag 32. However, the present invention is not limited thereto, and another index may be used additionally.

A further another modified example in which a child seat attachment detector 92 is used in addition to the rear occupancy detector 64 will be described below with reference to FIGS. 10 and 11. In this modified example, the vehicle 10 is configured such that the determination as to whether or not it is necessary to deploy/inflate the airbag 32 is made by detecting attachment of a child seat to the rear seat 16 in addition to the detection of the rear occupancy detector 64. Note that similar constituent elements to the implementation described above have been allocated identical reference symbols, and detailed description thereof has been omitted.

Figure 10:
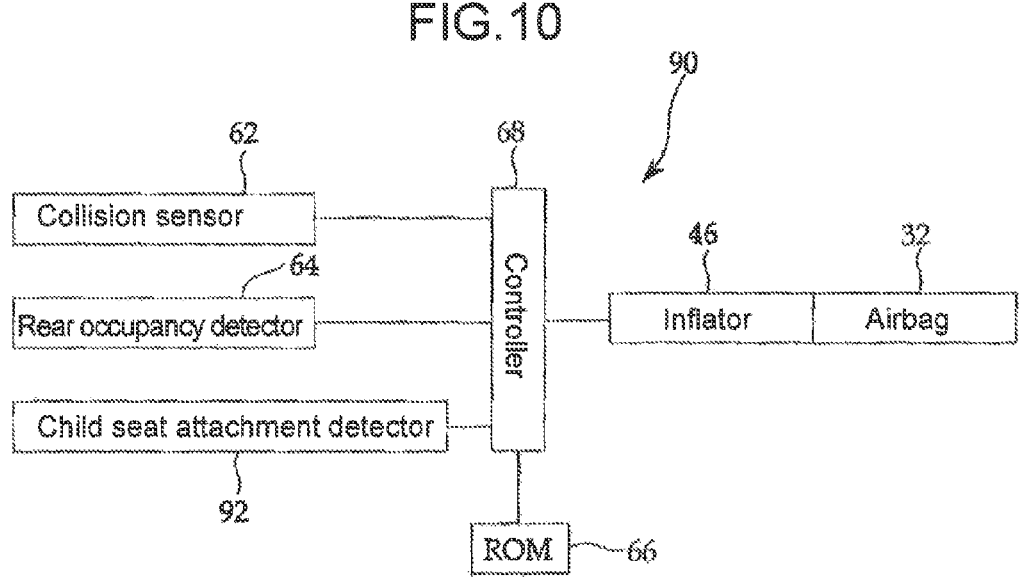
FIG. 10 is a block diagram illustrating a control circuit of the airbag 32 provided in the front seat 14 of the vehicle 10 according to a further another modified example of this implementation.
Figure 11:
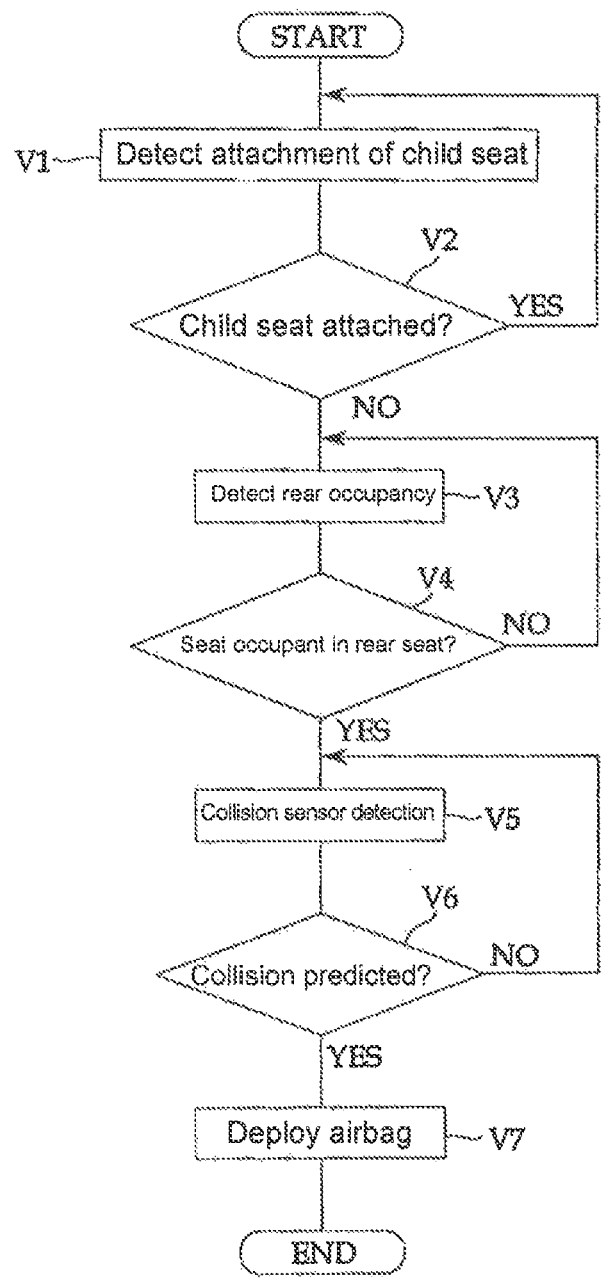
FIG. 11 is a flowchart illustrating deployment/inflation of the airbag 32 provided in the front seat 14 of the vehicle 10 according to this further another modified example of the implementation.

FIG. 10 is a block diagram illustrating a control circuit of the airbag 32 provided in the front seat 14 of the vehicle 10. FIG. 11 is a flowchart illustrating deployment/inflation of the airbag 32 provided in the front seat 14 of the vehicle 10.

Various sensors, such as an image sensor, an infrared ray sensor, a weight sensor, and a capacitance sensor, or a combination thereof, may be used as the child seat attachment detector 92 provided in a control circuit 90 illustrated in FIG. 10. In this modified example, the child seat attachment detector 92 is constituted by a combination of a pressure sensitive sensor (not illustrated) disposed over a wide range of the seat cushion 16a of the rear seat 16, and an attachment/detachment sensor that detects attachment and detachment of a seatbelt buckle. Note that the rear occupancy detector 64 may double as the pressure sensitive sensor.

Deployment/inflation control of the airbag 32 according to this modified example will now be described on the basis of the flowchart illustrated in FIG. 11. First, when the control is started in response to insertion of the ignition key into the automobile, the controller 68 detects the presence of an attached child seat using the child seat attachment detector 92 in a first step V1. More specifically, output from the pressure sensitive sensor and the attachment/detachment sensor disposed on the seat cushion of the rear seat 16 is supplied to the controller 68.

Next, in a second step V2, the controller 68 compares the supplied output with a preset output pattern stored in the ROM 66 to determine whether or not the supplied output matches the output pattern, i.e. whether or not a child seat is attached to the rear seat 16.

More specifically, when the pressure sensitive sensor supplies output indicating a dispersed load of a child seat, which is obtained from a bottom surface of the seat cushion and differs from the concentrated load generated by a person sitting down, and the attachment/detachment sensor supplies output indicating buckle attachment, it is determined that a child seat has been attached to the rear seat 16 (an affirmative determination), and therefore the control returns to the first step V1. When it is determined that a child seat has not been attached to the rear seat 16 (a negative determination), the control advances to a third step V3.

The third step V3 corresponds to the first step S1 of the implementation described above. In other words, the controller 68 detects the rear occupancy using the rear occupancy detector 64.

Then, when the controller 68 determines in a fourth step V4 (corresponding to the second step S2 of the implementation described above) on the basis of the output supplied from the rear occupancy detector 64 that the seat occupant Pr is present in the rear seat 16 (an affirmative determination), the control advances to a fifth step V5 (corresponding to the third step S3 of the implementation described above) When it is determined that the seat occupant Pr is not present in the rear seat 16 (a negative determination), the control returns to the third step V3.

In the fifth step V5, the detection output of the collision sensor 62 (the collision detector) is supplied to the controller 68. When it is determined in a sixth step V6 (corresponding to the fourth step S4 of the implementation described above) on the basis of this output that a rear collision is predicted (an affirmative determination), the control advances to a seventh step V7. When it is determined that a rear collision is not predicted (a negative determination), the control returns to the fourth step V4.

In the seventh step V7, the controller 68 outputs a signal to the inflator 46 in order to ignite the inflator 46. As a result, as illustrated in FIG. 3, the airbag 32 is deployed instantaneously by the gas ejected from the inflator 46 so as to inflate within the region between the suspended elastic support members 28 and the rear surface of the seat back 20.

According to this configuration, deployment/inflation of the airbag 32 can be controlled in accordance with the presence of the seat occupant Pr, similarly to the implementation described above. Furthermore, when a child seat is attached to the rear seat 16, or in other words when the impact exerted on the back surface of the seat back 20 of the front seat 14 from the rear is predicted to be small, the controller 68 cancels deployment/inflation of the airbag 32 in the front seat 14, and therefore unnecessary deployment/inflation of the airbag 32, as well as labor required to replace the airbag 32 and the inflator 46 and so on as a result, can be avoided.

Note that in the modified example described above, deployment/inflation of the airbag 32 is controlled by the child seat attachment detector 92 and the rear occupancy detector 64. However, deployment/inflation of the airbag 32 may be controlled by a combination of the child seat attachment detector 92 and another sensor, or by the child seat attachment detector 92 alone.

Further, in the implementation described above, the front seat 14 is the driving seat, but the front seat may be a front passenger seat adjacent to the driving seat. A further modified example in which the front seat is the front passenger seat will be described below with reference to FIGS. 12 to 14. In this modified example, the vehicle 10 is configured such that the determination as to whether or not it is necessary to deploy/inflate an airbag provided in a seat back of the front passenger seat is made in accordance with the presence of a seat occupant in the front passenger seat and the presence of a seat occupant in a rear seat 102 located behind the front passenger seat.

Figure 12:
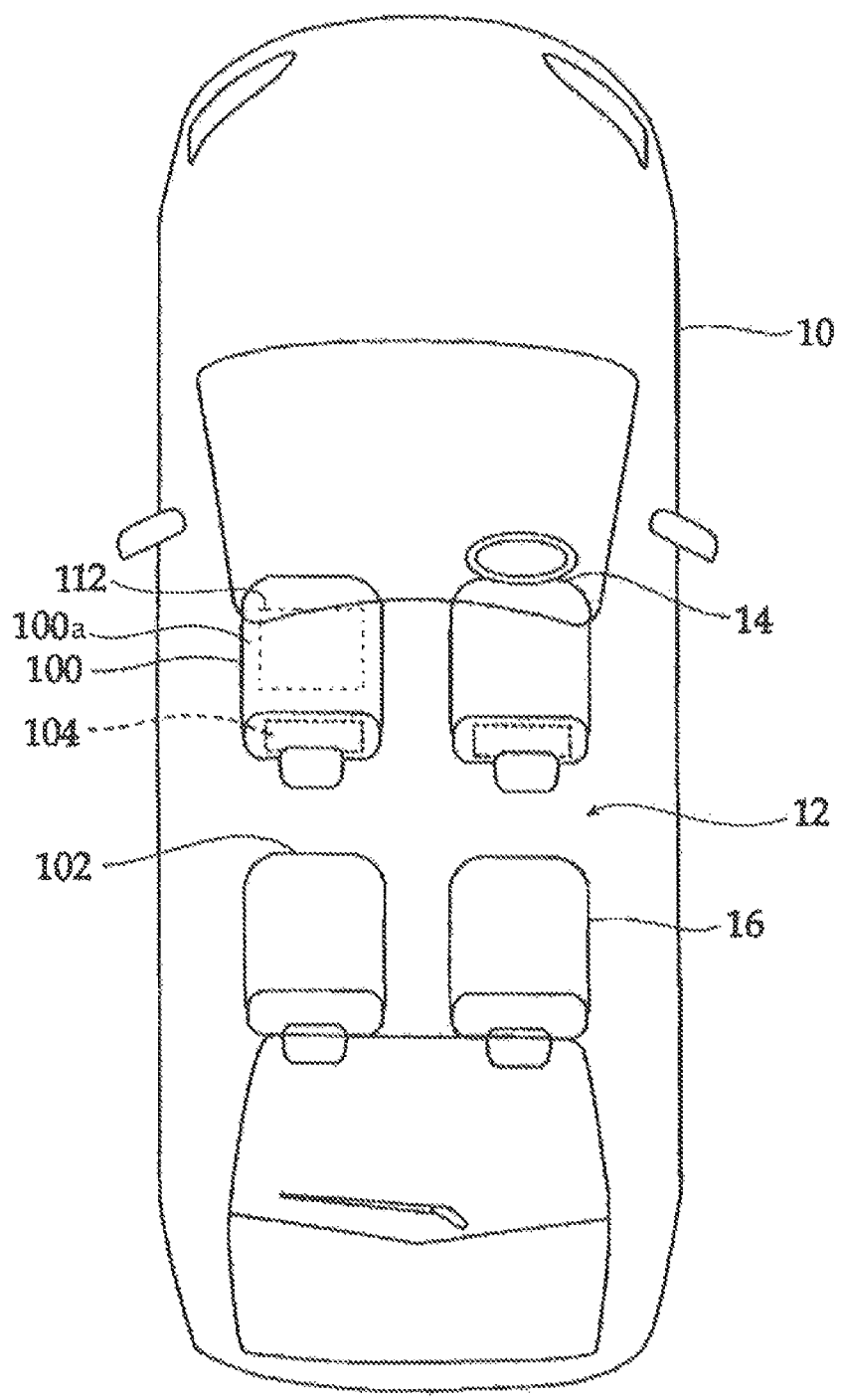
FIG. 12 is a schematic plan view illustrating the vehicle 10 according to a further another modified example of this implementation from above in order to illustrate a seat arrangement inside a passenger compartment.
Figure 13:
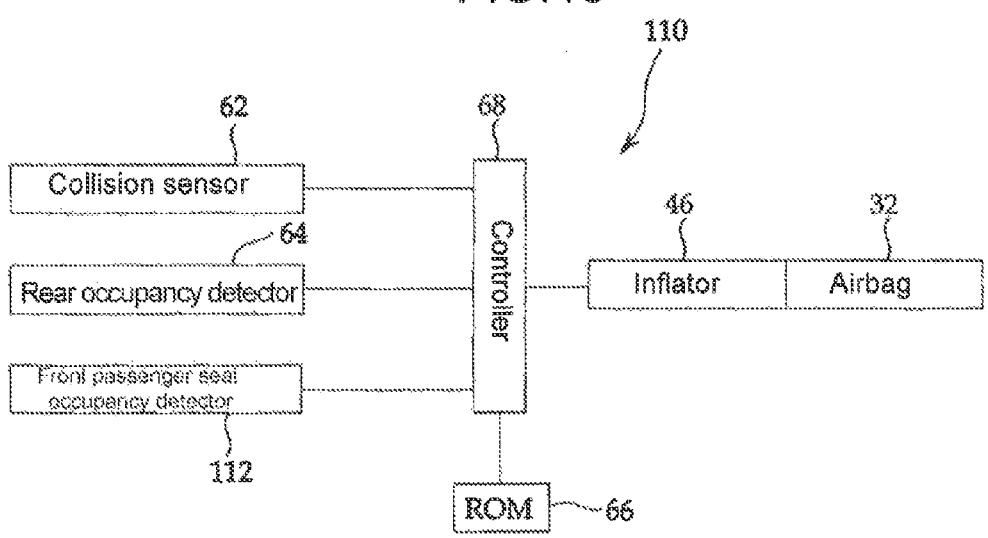
FIG. 13 is a block diagram illustrating a control circuit 80 of an airbag provided in the front seat 14 of the vehicle 10 according to this further another modified example of the implementation.
Figure 14:
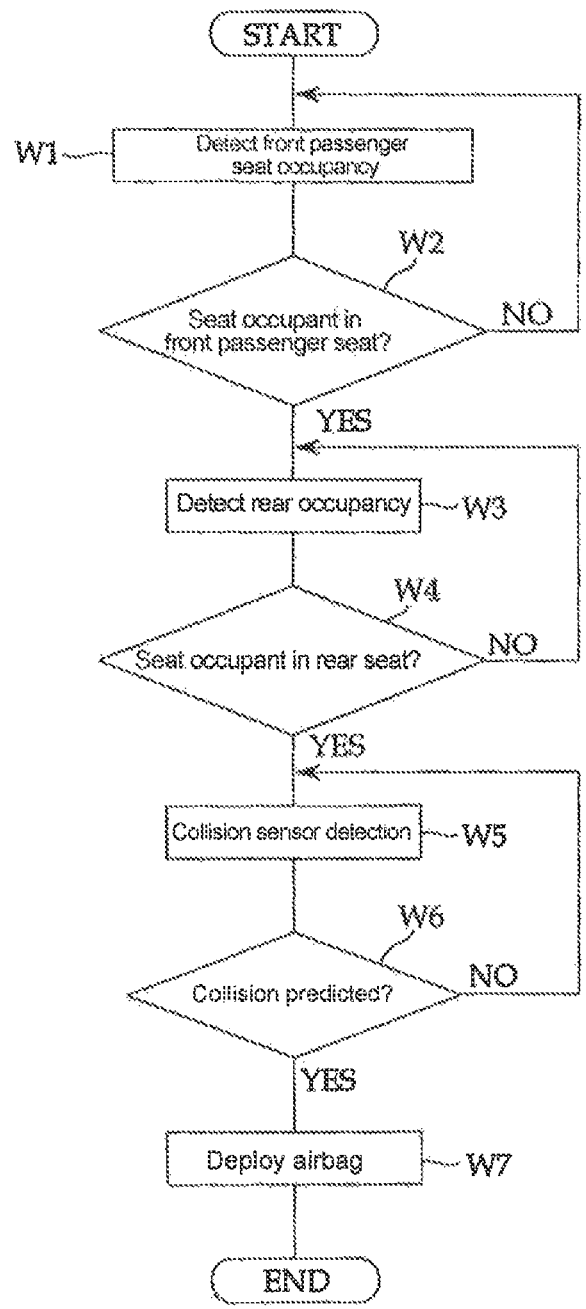
FIG. 14 is a flowchart illustrating deployment/inflation of the airbag provided in the front seat 14 of the vehicle 10 according to this further another modified example of the implementation.

FIG. 12 is a schematic plan view illustrating the vehicle 10 from above in order to illustrate a seat arrangement inside the passenger compartment 12. FIG. 13 is a block diagram illustrating a control circuit of an airbag provided in the front seat of the vehicle 10. FIG. 14 is a flowchart illustrating deployment/inflation of the airbag provided in the front seat 14 of the vehicle 10.

As illustrated in FIG. 12, a driving seat (the front seat 14) and a front passenger seat (a front seat 100) are disposed side by side at the front of the passenger compartment 12 of the vehicle 10 from a right side of the drawing, while the rear seat 16 and the rear seat 102 are disposed side by side at the rear. In this modified example, an airbag 104 is disposed in the seat back of the front passenger seat (the front seat 100) Note that specific configurations of the front seat 100 and the rear seat 102, including the airbag 104, are similar to corresponding configurations in the implementation described above, and therefore detailed description thereof has been omitted.

Various sensors, such as an image sensor, an infrared ray sensor, a weight sensor, and a capacitance sensor, may be used as a front passenger seat occupancy detector 112 of a control circuit 110 illustrated in FIG. 13. In this modified example, similarly to the implementation described above, the front passenger seat occupancy detector 112 is a pressure sensitive sensor disposed over a wide range of a seat cushion 100a of the front seat 100.

Deployment/inflation control executed on the airbag 104 by the controller 68 will now be described on the basis of the flowchart illustrated in FIG. 14. First, when the control is started in response to insertion of the ignition key into the automobile, the controller 68 detects front passenger seat occupancy using the front passenger seat occupancy detector 112 in a first step W1. Next, when the controller 68 determines in a second step W2 on the basis of output supplied from the front passenger seat occupancy detector 112 that a seat occupant is present in the front seat 100 (an affirmative determination) the control advances to a third step W3. When it is determined that a seat occupant is not present in the front seat 100 (a negative determination), the control returns to the first step W1.

The third step W3 to a seventh step W7 performed subsequently are identical to the first step S1 to the fifth step S5 of the implementation described above, and therefore description thereof has been omitted.

According to this configuration, when a seat occupant is not present in the front passenger seat, or in other words when a seat occupant to be protected does not exist in the front seat 100, deployment/inflation of the airbag 104 is canceled regardless of the body type of a seat occupant in the rear seat 102, the condition of a load carried in the rear seat 102, and so on. Therefore, unnecessary deployment/inflation of the airbag, as well as labor required to replace the airbag and the inflator and so on as a result, can be avoided.

Note that the present invention is not limited to the implementations described above, and may be subjected to various modifications within a scope that does not depart from the spirit of the invention. For example, in the implementations described above, a rear collision of the vehicle 10 was described as an example, but the collision is not limited to a rear collision. In the case of a front collision, for example, the order is reversed such that by deploying/inflating the airbag 32, the impact generated by forward movement of the knees of the rear seat occupant Pr can be received elastically first, whereupon rearward movement of the upper body of the front seat occupant can be received elastically.

The invention claimed is:

1. A vehicle that has a front seat in which an airbag is deployed so as to inflate in an interior of a seat back in response to a collision, and a rear seat disposed behind the front seat, the vehicle comprising:
   a rear occupancy detector that detects the presence of a seat occupant in the rear seat; and
   a controller that controls deployment/inflation of the airbag,
   wherein the deployment/inflation within the seat back is performed such that the deployed/inflated airbag elastically supports an upper body portion that extends from the waist to chest of a front seat occupant and elastically receives an impact force exerted on a back surface of the seat back; and
   the controller cancels the deployment/inflation when a seat occupant is not present in the rear seat.

2. The vehicle according to claim 1, wherein the controller controls the deployment/inflation such that the airbag expands between a suspended elastic support member supported by a seat back frame structure and seat back covering material facing the rear seat.

3. The vehicle according to claim 2, wherein the air bag is positioned in a storage state below a headrest supported by the seat back frame structure.

4. The vehicle according to claim 2, wherein the seat back frame structure includes an upper frame section extending above an expansion zone of the air bag, and a pair of side frame sections positioned on opposite sides, in the vehicle width direction, of the expansion zone.

5. The vehicle according to claim 1, wherein the vehicle further comprises a collision sensor for predicting or detecting a rear collision; and the deployment/inflation is performed after the collision sensor predicts or detects a rear collision.

6. The vehicle according to claim 1, wherein the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

7. A vehicle that has a front seat in which an airbag is deployed so as to inflate in an interior of a seat back in response to a collision, and a rear seat disposed behind the front seat, the vehicle comprising:
a child seat attachment detector that detects attachment of a child seat to the rear seat; and
a controller that controls deployment/inflation of the airbag, wherein
the deployment/inflation within the seat back is performed such that the deployed/inflated airbag elastically supports an upper body of a front seat occupant and elastically receives an impact force exerted on a back surface of the seat back; and
the controller cancels the deployment/inflation when a child seat is attached to the rear seat.

8. The vehicle according to claim 7, wherein
the vehicle further comprises a collision sensor for predicting or detecting a rear collision; and
the deployment/inflation is performed after the collision sensor predicts or detects a rear collision.

9. The vehicle according to claim 8, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

10. The vehicle according to claim 7, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

11. A vehicle that has a front seat in which an airbag is deployed so as to inflate in an interior of a seat back in response to a collision, and a rear seat disposed behind the front seat, the vehicle comprising:
a rear seat occupant type detector that detects a body type of a seat occupant of the rear seat; and
a controller that controls deployment/inflation of the airbag, wherein
the deployment/inflation within the seat back is performed such that the deployed/inflated airbag elastically supports an upper body of a front seat occupant and elastically receives an impact force exerted on a back surface of the seat back; and
the controller cancels the deployment/inflation when the type of the seat occupant is a predetermined body type.

12. The vehicle according to claim 11, wherein
the vehicle further comprises a collision sensor for predicting or detecting a rear collision; and
the deployment/inflation is performed after the collision sensor predicts or detects a rear collision.

13. The vehicle according to claim 12, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

14. The vehicle according to claim 11, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

15. A vehicle that has a front seat in which an airbag is deployed so as to inflate in an interior of a seat back in response to a collision, and a rear seat disposed behind the front seat, the vehicle comprising:
a rear seat load detector that detects a condition of a load carried on the rear seat; and
a controller that controls deployment/inflation of the airbag, wherein
the deployment/inflation within the seat back is performed such that the deployed/inflated airbag elastically supports an upper body of a front seat occupant and elastically receives an impact force exerted on a back surface of the seat back; and
the controller cancels the deployment/inflation when the load carried on the rear seat is in a predetermined condition.

16. The vehicle according to claim 15, wherein
the vehicle further comprises a collision sensor for predicting or detecting a rear collision; and
the deployment/inflation is performed after the collision sensor predicts or detects a rear collision.

17. The vehicle according to claim 16, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

18. The vehicle according to claim 15, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

19. A vehicle that has a front seat in which an airbag is deployed so as to inflate in an interior of a seat back in response to a collision, and a rear seat disposed behind the front seat, the vehicle comprising:
a rear occupancy detector that detects the presence of a seat occupant in the rear seat; and
a controller that controls deployment/inflation of the airbag,
wherein the deployment/inflation within the seat back is performed such that the deployed/inflated airbag elastically supports an upper body of a front seat occupant and elastically receives an impact force exerted on a back surface of the seat back; and
the controller cancels the deployment/inflation when a seat occupant is not present in the rear seat, and
wherein the vehicle further comprises a collision sensor for predicting or detecting a rear collision; and
the deployment/inflation is performed after the collision sensor predicts or detects a rear collision.

20. The vehicle according to claim 19, wherein
the front seat is a front passenger seat, and the vehicle further comprises a front passenger seat occupancy detector for detecting the presence of a seat occupant in the front passenger seat; and
the deployment/inflation is canceled when a seat occupant is not present in the front passenger seat.

21. A vehicle that has a front seat in which an airbag is deployed so as to inflate in an interior of a seat back in response to a collision, and a rear seat disposed behind the front seat, the vehicle comprising:
- a rear occupancy detector that detects the presence of a seat occupant in the rear seat; and
- a controller that controls deployment/inflation of the airbag,
- wherein the deployment/inflation within the seat back is performed such that the deployed/inflated airbag elastically supports an upper body of a front seat occupant and elastically receives an impact force exerted on a back surface of the seat back; and
- the controller cancels the deployment/inflation when a seat occupant is not present in the rear seat, and wherein the front seat is a front passenger seat, and the vehicle further comprises a front passenger seat occupancy detector for detecting the presence of a seat occupant in the front passenger seat; and
- the deployment/inflation is canceled when a seat occupant is not present in the front passenger seat.

\* \* \* \* \*